United States Patent [19]

Sekiguchi

[11] Patent Number: 5,442,395
[45] Date of Patent: Aug. 15, 1995

[54] FIT CCD IMAGE SENSOR INCORPORATING GATED LINE SHIFT PULSES

[75] Inventor: Katsuo Sekiguchi, Kanagawa, Japan
[73] Assignee: Sony Corporation, Tokyo, Japan
[21] Appl. No.: 94,339
[22] Filed: Jul. 20, 1993
[30] Foreign Application Priority Data
  Jul. 21, 1992 [JP] Japan .................. 4-194102
[51] Int. Cl.$^6$ .............................................. H04N 3/14
[52] U.S. Cl. ...................... 348/312; 348/319
[58] Field of Search ............... 348/314, 317, 319, 312; H04N 3/14, 3/15

[56] References Cited

U.S. PATENT DOCUMENTS

| | | | |
|---|---|---|---|
| 4,573,078 | 2/1986 | Rentsch et al. | 348/317 |
| 4,821,105 | 3/1989 | Suga et al. | 348/314 X |
| 4,963,982 | 10/1990 | Hieda | 348/314 X |

*Primary Examiner*—Wendy R. Greening
*Attorney, Agent, or Firm*—Hill, Steadman & Simpson

[57] ABSTRACT

An electric power consumption and a quantity of generated heat can be reduced and hence a temperature characteristic can be maintained satisfactorily. A timing generator generates a smear gate pulse and a storage section driving pulse. The smear gate pulse is supplied to a smear gate region, whereby the smear gate region is opened during a vertical blanking period. The smear gate pulse and the storage section driving pulse are input to a gate circuit and an image section driving pulse is output from the gate circuit. The image section driving pulse has a waveform corresponding to a waveform which results from eliminating a line shift pulse from the storage section driving pulse. In the present invention, since the line shift pulse is not contained in the image section driving pulse, an electric power consumed by an image section is reduced considerably as compared with the prior art. Therefore, a quantity of generated heat also can be reduced, and a temperature characteristic of a frame interline transfer (FIT) solid state image sensor can be maintained satisfactorily.

5 Claims, 5 Drawing Sheets

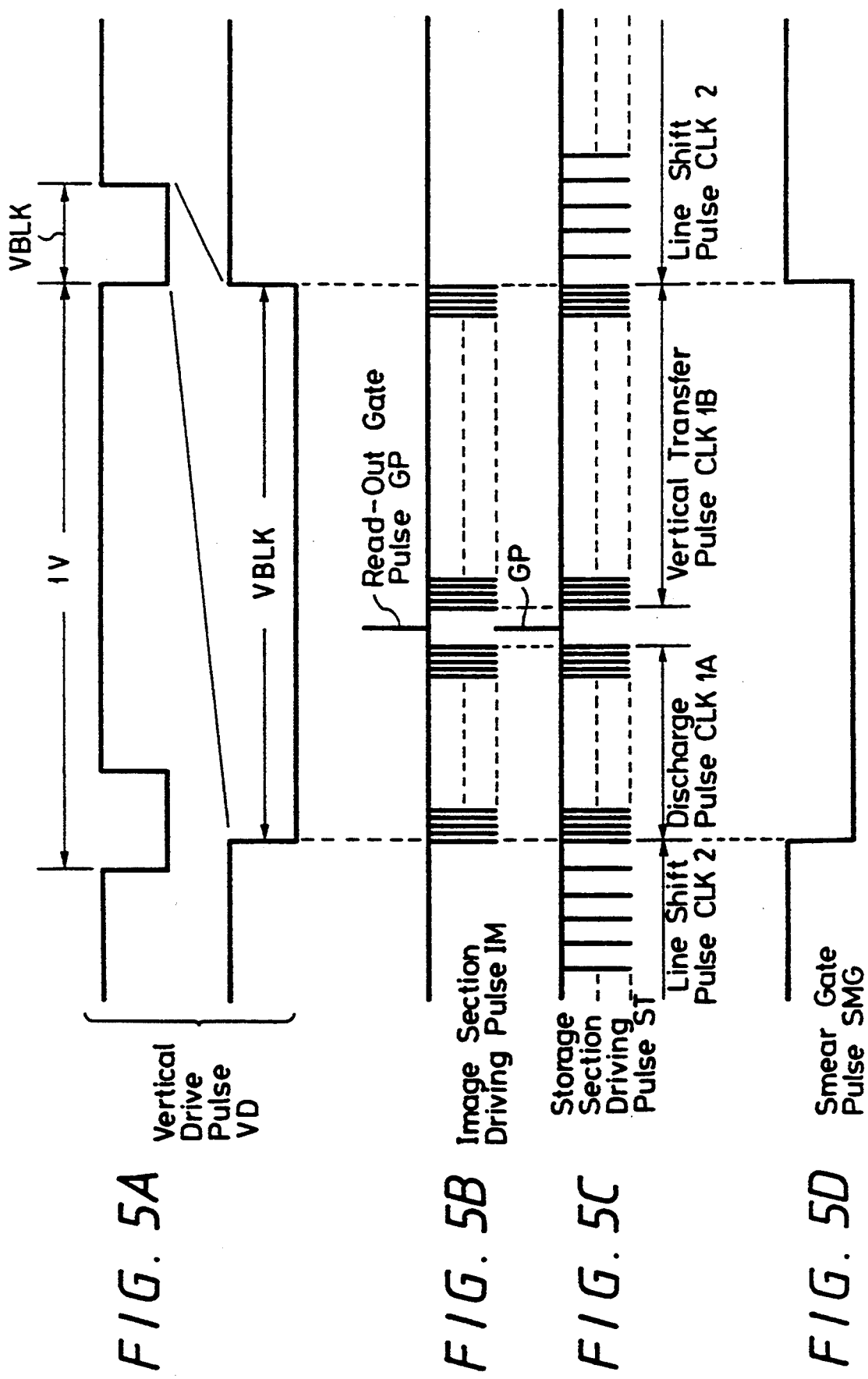

FIT CCD IMAGE SENSOR INCORPORATING GATED LINE SHIFT PULSES

BACKGROUND OF THE INVENTION

1. Field of the Invention

The present invention relates to a frame interline transfer (FIT) type solid state image sensor in which an electric power consumption can be saved and a temperature characteristic thereof can be maintained satisfactorily.

2. Description of the Prior Art

One conventional solid state image sensor is referred to as a frame interline transfer (FIT) type solid state image sensor. In FIG. 1 of the accompanying drawings, this conventional FIT type solid state image sensor is generally depicted by reference numeral 1 and comprises an image section (image area) 2, a storage section 3 (field memory), a horizontal transfer section 4 and a smear drain 5.

The image section 2 comprises a plurality of light sensing sections 21 disposed in a matrix fashion and first vertical transfer sections (vertical shift registers) 22, each being disposed vertically between adjacent vertically arranged light sensing sections 21 for transferring signal charges accumulated in the light sensing sections 21 in the vertical direction. A read-out gate region 23 is provided between the light sensing sections 21 and the first vertical transfer section 22.

The storage section 3 is disposed under the image section 2 and a signal charge of one field transferred by the first vertical transfer section 22 is temporarily stored in the storage section 3. The storage section 3 is composed of a plurality of vertical transfer sections (vertical shift registers) 31 and signal charges stored therein are transferred by one line each to the horizontal transfer section (horizontal shift register) 4 from which transferred signal charges are sequentially output at a predetermined timing. The horizontal transfer section 4 has at its one end a voltage converting section 41 that converts the signal charge, which is transferred to the horizontal direction, into an electrical signal (signal voltage). The voltage converting section 41 derives an image signal and the image signal is supplied through an amplifier 42 to an output terminal 43.

In the FIT solid state image sensor 1, a signal charge is transferred from the first vertical transfer section 22 to the second vertical transfer section 31 and then transferred to the horizontal transfer section 4. Thereafter, a discharge processing is effected to discharge a part of signal charges remaining in the first and second vertical transfer sections 22 and 31, i.e., unnecessary signal charges. According to this discharge processing, unnecessary signal charges remaining at the first and second vertical transfer sections 22 and 31 are transferred to the smear gate drain 5 through a smear gate region 52 and then supplied to a discharge terminal 51.

The FIT solid state image sensor 1 is connected through drivers 6A, 6B to a timing generator 7 when in use. Various control signals generated by the timing generator 7 are amplified by drivers 6A, 6B and then supplied to the FIT solid state image sensor 1, whereby the respective sections of the FIT solid state image sensor 1 are driven to output the image signal.

FIGS. 3A through 3D are respectively diagrams of waveforms of various control signals that are utilized to drive the FIT solid state image sensor 1. FIG. 3A shows a waveform of a vertical drive pulse VD. In the FIT solid state image sensor 1, unnecessary signal charges are discharged and signal charges are read out during a vertical blanking period VBLK. During the vertical blanking period VBLK, a smear gate pulse SMG whose waveform is illustrated in FIG. 3D is supplied to the smear gate region 52, thereby the smear gate 52 being opened.

During the vertical blanking period VBLK, an image section driving pulse IM whose waveform is illustrated in FIG. 3B is supplied to the image section 2 and a storage section driving pulse ST whose waveform is illustrated in FIG. 3C is supplied to the storage section 3. Of the driving pulses IM and ST, a high speed discharge pulse CLK1A is supplied to the first and second vertical transfer sections 22 and 31. Therefore, unnecessary signal charges that are still remaining in the first and second vertical transfer sections 22 and 31 immediately after signal charges had been transferred are transferred through the smear gate region 52 to the smear drain 5 from which they are supplied to the discharge terminal 51.

Then, a read-out gate pulse GP of the image section driving pulse IM is applied to the read-out gate region 23, whereby signal charges accumulated in the light sensing section 21 are transferred to the first vertical transfer section 22. Thus, the signal charges are read out. The signal charges thus read out are then transferred from the first vertical section 22 to the second vertical section 31 in response to a vertical transfer pulse CLK1B.

A line shift pulse CLK2 of the storage section drive pulse ST is then supplied to the second transfer section 31 and at a timing of this line shift pulse CLK2, the signal charge in the storage section 3 is transferred to the horizontal transfer section 4 line by line. The signal charge thus transferred will hereinafter be converted into an image signal by the aforesaid processing and then supplied to the output terminal 43.

In the conventional FIT solid state image sensor 1, as shown in FIGS. 3A through 3D, the image section driving pulse IM supplied to the image section 2 and the storage section driving pulse ST supplied to the storage section 3 are exactly the same and therefore the two driving pulses IM and ST contain the discharge pulse CLK1A, the vertical transfer pulse CLK1B and the line shift pulse CLK2. As a consequence, the line shift pulse CLK2 that is not related to the driving of the image section 2 also is supplied to the image section 2, consuming a useless electric power thereby.

Further, in the conventional FIT solid state image sensor 1, the signal charge read out to the first vertical transfer section 22 must be transferred to the second vertical transfer section 31 at high speed, requiring a lot of vertical transfer pulses CLK1B per field period as compared with other solid state image sensors such as an interline transfer (IT) type solid state image sensor or the like. Consequently, as compared with other solid state image sensors such as the IT type solid state image sensor or the like, the number with which the drivers 6A, 6B are switched is increased, which unavoidably increases an electric power consumption. Furthermore, the conventional FIT type solid state image sensor 1 consumes a large electric power as described above. There is then the problem that a quantity of generated heat is increased to exert a bad influence on the characteristics of the FIT type solid state image sensor.

OBJECTS AND SUMMARY OF THE INVENTION

Therefore, it is a general object of the present invention to provide an improved FIT solid state image sensor in which the aforesaid shortcomings and disadvantages encountered with the prior art can be eliminated.

More specifically, it is an object of the present invention to provide an FIT solid state image sensor in which an electric power consumption can be reduced.

According to an aspect of the present invention, there is provided a frame interline transfer solid state image sensor which comprises an image section formed of light sensing sections disposed in a matrix fashion and a first vertical transfer section for transferring signal charges read out from the light sensing sections in the vertical direction, a storage section having a second transfer section for temporarily accumulating a signal charge that is transferred from the first vertical transfer section in the vertical direction during a frame shift period, a horizontal transfer section for reading out the signal charge accumulated in the storage section at every horizontal line during a line shift period, a smear drain having a smear gate region disposed between it and the first vertical transfer section or the second vertical transfer section for discharging unnecessary signal charge of the first vertical transfer section and the second vertical transfer section, and a section for supplying a discharge pulse to the first vertical transfer section and the second vertical transfer section to discharge the unnecessary signal charges to the smear drain before a signal charge is read out from the light sensing section to the second vertical transfer section through the first vertical transfer section, wherein an amplitude of a line shift pulse supplied to the first vertical transfer section during the line shift period is fixed to a predetermined level and signal charges accumulated in the second vertical transfer section are sequentially transferred to the horizontal transfer section at every horizontal line by the line shift pulse supplied to the second vertical transfer section during the line shift period.

According to the above-mentioned structure, a timing generator generates a smear gate pulse and a storage section driving pulse. The smear gate pulse is supplied to a smear gate region through a driver, whereby the smear gate region is opened during a vertical blanking period. The smear gate pulse and the storage section driving pulse are input to a NAND circuit and an image section driving pulse is output from the NAND circuit. Therefore, the image section driving pulse has a waveform corresponding to a waveform which results from eliminating a line shift pulse from the storage section driving pulse.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 5A through 5D are diagrams of waveforms of control signals that are utilized to drive the FIT type solid state image sensor shown in FIG. 4, respectively.

DETAILED DESCRIPTION OF THE PREFERRED EMBODIMENT

An FIT solid state image sensor according to an embodiment of the present invention will now be described with reference to the drawings.

Figure 1:
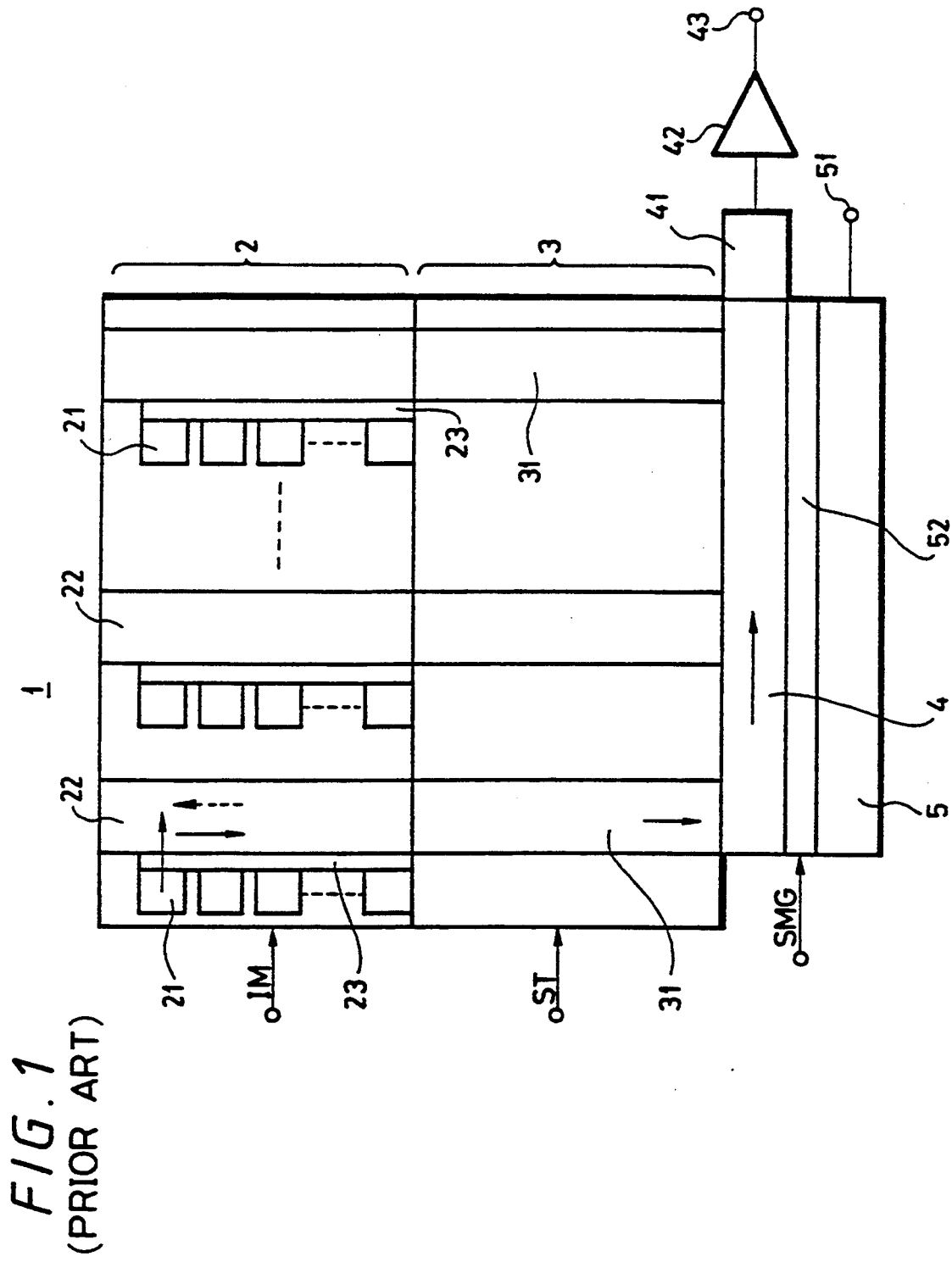
FIG. 1 is a diagram showing a structure of a conventional FIT solid state image sensor.
Figure 2:
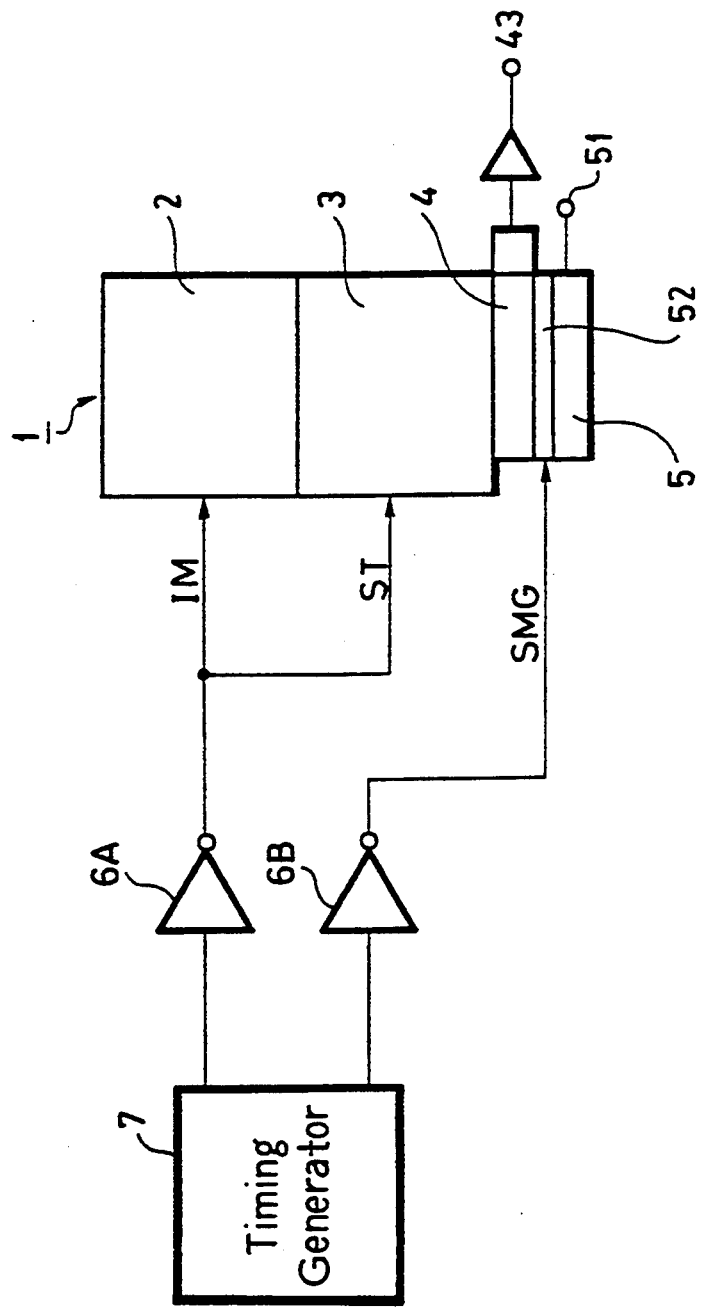
FIG. 2 is a diagram showing a driving device of the conventional FIT solid state image sensor shown in FIG. 1.
Figure 3:
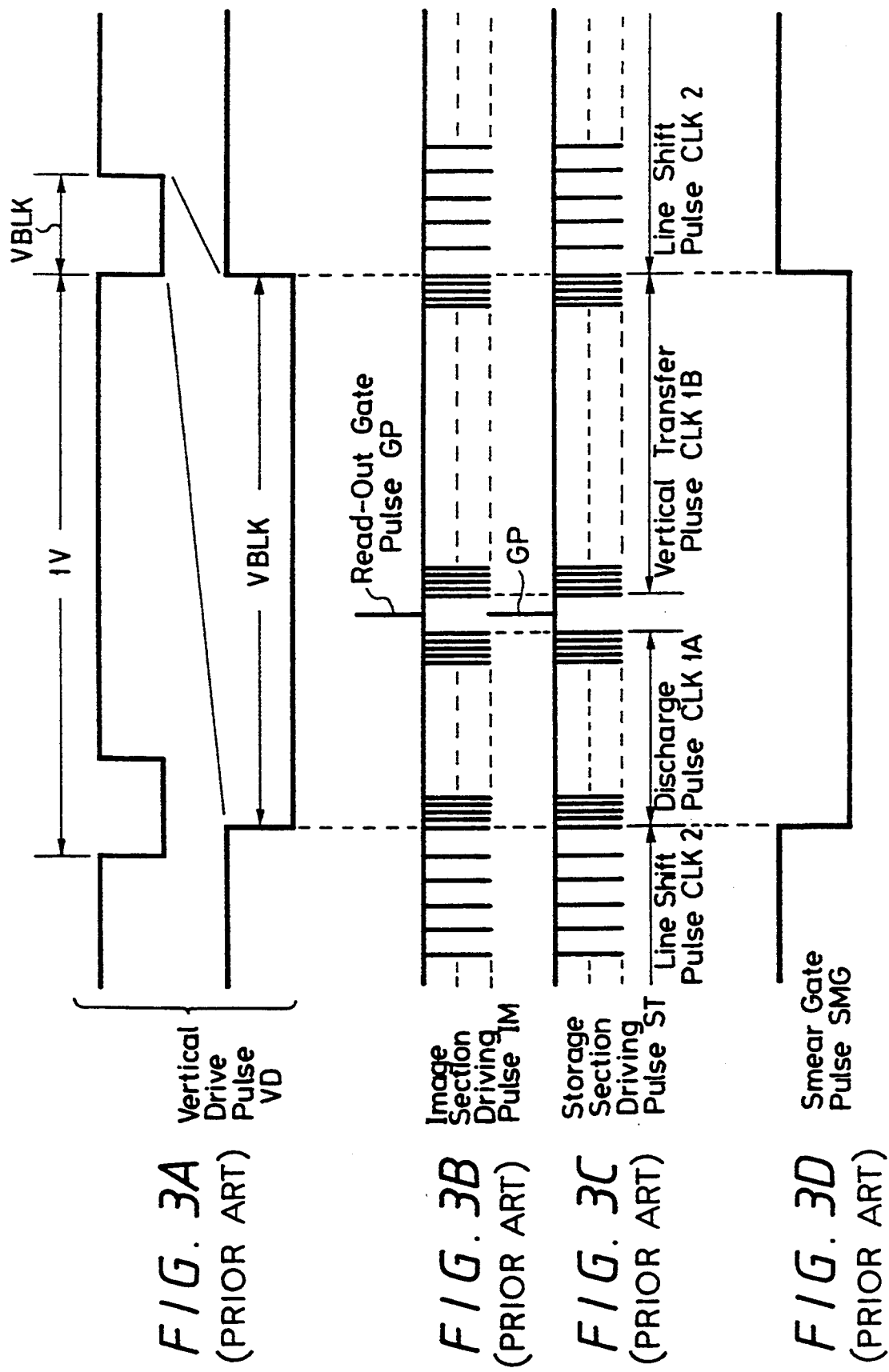
FIGS. 3A through 3D are diagrams of waveforms of control signals that are utilized to drive the conventional FIT solid state image sensor shown in FIG. 1, respectively.
Figure 4:
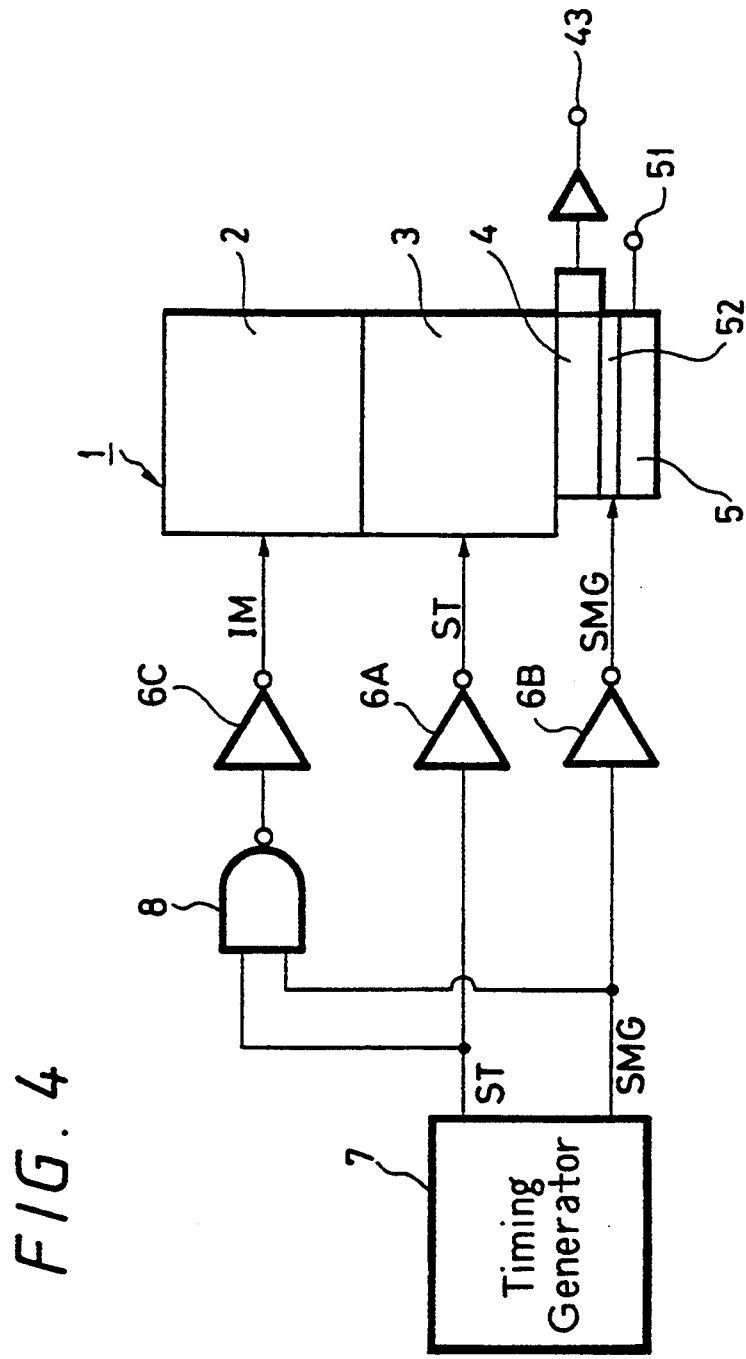
FIG. 4 is a diagram showing a structure of a driving device for an FIT solid state image sensor according to an embodiment of the present invention.

FIG. 4 shows a structure of a driving device for the FIT solid state image sensor according to the present invention. In FIG. 4, like parts corresponding to those of FIGS. 1 and 2 are marked with the same references and therefore need not be described in detail.

As shown in FIG. 4, the FIT solid state image sensor 1 is coupled to the timing generator (T.G) 7 via drivers 6A, 6B, 6C and a NAND circuit 8. The timing generator 7 generates a storage section driving pulse ST shown in FIG. 5C and a smear gate pulse SMG shown in FIG. 5D. The storage section driving pulse ST and the smear gate pulse SMG are supplied through the drivers 6A, 6B to the storage section 3 and the smear gate region 52.

The storage section driving pulse ST and the smear gate pulse SMG are also input to the NAND circuit 8. An image section driving pulse IM shown in FIG. 5B is generated by the NAND circuit 8 and then supplied to the image section 2. The image section drive pulse IM comprises a discharge pulse CLK1A, the read-out gate pulse GP and the vertical transfer pulse CLK1B and does not contain a line shift pulse CLK2.

In this FIT solid state image sensor 1, the smear gate pulse SMG is generated from the timing generator 7 during the vertical blanking period VBLK of the vertical driving pulse VD shown in FIG. 5A, whereby the smear gate 52 is kept open during the vertical blanking period VBLK.

The discharge pulse CLK1A of the image section driving pulse IM or the storage section driving pulse ST is supplied to the first vertical transfer section 22 or the second vertical transfer section 31, whereby unnecessary signal charges remaining in the first and second vertical transfer sections 22 and 31 are transferred to the smear drain 5 through the smear gate region 52 and thereby supplied to the discharge output terminal 51.

Then, the read-out gate pulse GP of the image section driving pulse IM is supplied to the read-out gate region 23, whereby the signal charge accumulated in the light sensing section 21 is read out to the first vertical transfer section 22. The vertical transfer pulse CLK1B is then supplied to the first and second vertical transfer sections 22 and 31, whereby the signal charge read out to the first vertical transfer section 22 is transferred to the second vertical transfer section 31.

A line shift pulse CLK2 is supplied to the second vertical transfer 31, whereby signal charges within the second vertical transfer section 31 are transferred to the horizontal transfer section 4 line by line. Similar processings are carried out and hence the image signal is output to the output terminal 43.

According to the FIT solid state image sensor 1, the image section driving pulse IM does not contain the line shift pulse CLK2 so that an electric power consumption can be considerably reduced as compared with the prior art. To be more concrete, the number of the pulses of the line shift pulse CLK2, the discharge pulse CLK1A and the vertical transfer pulse CLK1B is the same so that electric power consumed by the respective pulses in the respective sections is each reduced by $\frac{1}{3}$. In this embodiment, the electric power consumption can be reduced by the amount consumed by the line shift pulse CLK2, i.e., $\frac{1}{3}$.

Further, with respect to the whole electric power consumption including the electric power consumptions of the respective sections by the storage section driving pulse ST, the electric power consumption of about 1/6 can be reduced as compared with the prior art. Therefore, a quantity of generated heat at the respective sections can be reduced and characteristics can be maintained satisfactorily.

As described above, according to the FIT solid state image sensor of the present invention in which unnecessary signal charges are discharged, the line shift pulse contained in the image section driving pulse can be removed at the timing of the smear gate pulse unlike the prior art.

Therefore, according to the present invention, since the line shift pulse that is not related to the driving of the image section is not supplied, an electric power that is consumed by the image section can be reduced considerably. Thus, when this FIT solid state image sensor is applied, for example, to a small camera or the like, a battery of the camera can be utilized for a long period of time. Further, since a quantity of heat generated in the respective sections can be considerably reduced, a temperature characteristic of the FIT solid state image sensor can be maintained satisfactorily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A frame interline transfer solid state image sensor comprising:
   a) an image section formed of light sensing sections disposed in a matrix fashion and a first vertical transfer section for transferring signal charges read out from said light sensing sections in the vertical direction;
   b) a storage section having a second vertical transfer section for temporarily accumulating a signal charge that is transferred from said first vertical transfer section in the vertical direction during a frame shift period:
   c) a horizontal transfer section for reading out a signal charge accumulated in said storage section at every horizontal line during a line shift period:
   d) a smear drain having a smear gate region disposed between it and said second vertical transfer section for discharging unnecessary signal charges of said first vertical transfer section through said second vertical transfer section and for discharging unnecessary signal charge of said second vertical transfer section; and
   e) means for supplying a discharge pulse to said first vertical transfer section and said second vertical transfer section to discharge said unnecessary signal charges to said smear drain before a signal charge is read out from said light sensing section to said second vertical transfer section through said first vertical transfer section, wherein an amplitude of a signal supplying line shift pulses to said first vertical transfer section only during said frame shift period is fixed to a predetermined level during said line shift period and signal charges accumulated in said second vertical transfer section are sequentially transferred to said horizontal transfer section at every horizontal line by a signal supplying line shift pulse supplied to said second vertical transfer section during said line shift period.

2. The frame interline transfer solid state image sensor according to claim 1, wherein said predetermined level of said signal supplying line shift pulses to said first vertical transfer section is set to an intermediate level between a maximum level of a read-out pulse read out from said light sensing section to said first vertical transfer section and a minimum value of said signal supplying line shift pulses to said first vertical transfer section during said frame shift period.

3. The frame interline transfer solid state image sensor according to claim 1, wherein the level of said signal supplying line shift pulses supplied to said first vertical transfer section during said frame shift period is set to be the same level as the maximum level of the signal supplying line shift pulses supplied to said signal supplying second vertical transfer section.

4. The frame interline transfer solid state image sensor according to claim 1, wherein said line shift pulses supplied to said first vertical transfer section is obtained from a logical gate to which is input a smear gate pulse supplied to said smear gate region and the signal supplying line shift pulses supplied to said second vertical transfer section.

5. The frame interline transfer solid state image sensor according to claim 1, wherein said signal supplying line shift pulses supplied to said first vertical transfer section is an output of an NAND circuit to which there are input said smear gate pulse and said signal supplying line shift pulses supplied to said second vertical transfer section.

* * * * *